United States Patent [19]

Makowski et al.

[11] 4,153,588

[45] May 8, 1979

[54] METAL NEUTRALIZED SULFONATED EPDM TERPOLYMERS AND COMPOSITIONS THEREOF

[75] Inventors: Henry S. Makowski, Scotch Plains; Robert R. Klein, Berkeley Heights; Robert D. Lundberg, Bridgewater, all of N.J.

[73] Assignee: Exxon Research & Engineering Co., Florham Park, N.J.

[21] Appl. No.: 855,724

[22] Filed: Nov. 29, 1977

[51] Int. Cl.$^2$ .............................................. C08L 91/00
[52] U.S. Cl. .................... 260/23.5 A; 260/23.7 N; 260/31.2 R; 260/32.6 A; 260/33.6 AQ; 260/42.33; 260/42.47; 260/DIG. 31
[58] Field of Search .................. 260/79.3 R, 33.6 AO, 260/33.6 PQ, 42.33, 42.47, 31.2 R, 23.7, 23.5 A

[56] References Cited

U.S. PATENT DOCUMENTS

| B 487,467 | 4/1976 | Lundberg et al. | 260/32.6 A |
|---|---|---|---|
| 3,642,728 | 2/1972 | Canter | 260/79.5 A |
| 3,847,854 | 11/1974 | Canter et al. | 260/32.8 A |
| 3,974,241 | 8/1976 | Lundberg et al. | 260/28.5 R |
| 4,014,831 | 3/1977 | Bock et al. | 260/23 H |

*Primary Examiner*—Lewis T. Jacobs
*Attorney, Agent, or Firm*—Richard E. Nanfeldt

[57] ABSTRACT

This invention relates to plasticized metal neutralized sulfonated EPDM terpolymers having at least 65 wt. % of ethylene in the backbone of the EPDM terpolymer and extended compositions of these metal neutralized sulfonated EPDM terpolymers having 100 parts of a neutralized sulfonated EPDM terpolymer; less than about 100 parts per hundred of a non-polar process oil; less than about 300 parts per hundred of a filler; and a preferential plasticizer at about less than 60 parts per hundred based on 100 parts of the sulfonated elastomeric polymer. These compositions can be readily processed due to their superior rheological properties on conventional plastic fabrication equipment, especially on low pressure injection molding and extrusion equipment into elastomeric articles having improved physical properties.

16 Claims, No Drawings

METAL NEUTRALIZED SULFONATED EPDM TERPOLYMERS AND COMPOSITIONS THEREOF

BACKGROUND OF THE INVENTION

1. Field of the Invention

This invention relates to plasticized metal neutralized sulfonated EPDM terpolymers having at least 65 wt. % of ethylene in the backbone of the EPDM terpolymer and extended compositions of these metal neutralized sulfonated EPDM terpolymers having 100 parts of a neutralized sulfonated EPDM terpolymer; less than about 100 parts per hundred of a non-polar process oil; less than about 300 parts per hundred of a filler; and a preferential plasticizer at about less than 60 parts per hundred based on 100 parts of the sulfonated elastomeric polymer. These compositions can be readily processed due to their superior rheological properties on conventional plastic fabrication equipment, especially on low pressure injection molding and extrusion equipment into elastomeric articles having improved physical properties.

2. Description of the Prior Art

Recently, a new class of thermoelastic sulfonated polymers has been described in a number of U.S. Patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily useable in a certain number of limited applications, they are not as readily adaptable for the manufacture of an injection moldable elastomeric article such as footwear as are the improved compositions of the present invention, wherein both improved physical and rheological properties are realized. U.S. Pat. No. 3,642,728 fails to teach, imply or infer the criticality of selection of the basic EPDM to be sulfonated, wherein the EPDM terpolymer must have an ethylene content of at least 65 wt. percent in order to obtain improved physical properties.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention, since U.S. Pat. No. 3,836,511 fails to realize the criticality of selection of an EPDM with a high ethylene content.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles such as footwear formed by an injection molding process as are the compositions of the present invention, since U.S. Pat. No. 3,870,841 fails to realize the criticality of using an EPDM terpolymer with at least 65 wt. percent ethylene in order to obtain systems having improved physical properties.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. This patent again fails to teach the criticality of selection of the EPDM terpolymer in order to obtain maximum physical properties.

U.S. Pat. No. 3,887,530, herein incorporated by reference, demonstrates that partly crystalline EPDM's can be sulfonated and neutralized to produce materials which are superior in physical properties to those obtained from amorphous EPDM systems. These materials of themselves are not desirable because they are very difficult to process and mix. This patent does not teach, imply or infer how these improved products can be processed in conventional extrusion and injection molding operations. This patent further fails to teach the differences in melt viscosities that are obtained through the use of different metal counterions in the metal sulfonate group and that the zinc counterion is outstanding in this regard from all the rest. This patent fails to teach that metal sulfonate high ethylene content EPDM's can be transformed into processable thermoplastic elastomers through the use of the appropriate cations and the appropriate ionic domain plasticizer.

Products resulting from the aforementioned methods for obtaining neutralized sulfonated elastomeric compositions, do not possess the improved balance of rheological and physical properties for the applications envisioned in the present invention.

For example, the physical properties of these resultant patents are unsuitable for a major application of an injection molding process, namely the manufacture of a ski boot. The materials of the aforementioned patents which are generally processable by only compression molding have unsuitable physical properties for this major application of ski boots. Additionally, the metal neutralized sulfonated EPDM terpolymers of the instant application can be used in the manufacture of medical tubing by an extrusion process, wherein excellent strength and increased flexibility are desired properties which was previously unattainable by employing the compositions of the aforementioned patents.

Increasing the ethylene content in the backbone of the EPDM improves the physical properties substantially over lower ethylene content products. The unplasticized gums, however, possess high melt viscosities and of themselves cannot be processed and are difficult to mix. Quite unexpectedly the use of select ionic domain plasticizers, notably zinc stearate, not only substantially improves melt flow so that the plasticized gums are processable and mixable but also maintains and even improves the physical properties of the base system. The improvements in physical properties and in melt flow through the use of high ethylene content EPDM's and zinc stearate plasticizer are also present in the extended compositions containing fillers and oils.

The unique and novel improved metal neutralized sulfonated EPDM terpolymers and their extended compositions of the present invention overcome the deficiencies of the aforementioned U.S. Patents by providing an improved balance of rheological and physical properties. The blend compositions of the present invention solve the problem of having a material which has both desirable rheological and physical properties for the manufacture of an elastomeric article such as a ski boot, automotive parts such as facia, bumper guards and the like.

SUMMARY OF THE INVENTION

It has been found surprisingly that improved plasticized metal neutralized sulfonated EPDM terpolymers and compositions formed from blends of these plasticized metal neutralized sulfonated EPDM terpolymers, inorganic fillers, and non-polar process oils have an improved balance of rheological and physical properties for the formation of an elastomeric article, such as ski boots, facia, bumper guards and the like by a low pressure injection molding process. The plasticized metal neutralized sulfonated EPDM terpolymers have at least 65 wt. % ethylene in the EPDM terpolymer.

Accordingly, it is an object of our present invention to provide unique and novel plasticized, metal neutralized sulfonated EPDM having at least about 65 wt. % ethylene in the backbone of the EPDM terpolymer as well as blend compositions of these plasticized metal neutralized sulfonated EPDM terpolymer with fillers and oils, wherein these compositions are readily fabricated into high performance elastomeric articles by either a low pressure injection molding or extrusion process.

It is an object of the instant invention to describe a class of compounds based on sulfonated ethylenepropylene terpolymers having at least 65 wt. % ethylene in the EPDM backbone which can be processed on plastics type extrusion or injection molding equipment at high rates and which possess an improved balance of rheological and physical properties such as tensile strength at 25° C. or 70° C., improved hardness, and improved flexibility. One of the essential aspects of the present invention comprises the discovery that only a restricted class of the subject sulfonated EPDM terpolymer may be readily employed for low pressure injection molding or extrusion fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated EPDM terpolymers which have at least about 65 wt. % ethylene in the backbone of the EPDM terpolymer.

A substantial segment of the plastics and rubber fabrication industry employs a fabrication technique known as low pressure injection molding to form articles which can be classified as injection molded articles. Applications employing this fabrication technique are elastomeric ski boots and automotive bumper parts which require materials which are flexible and extremely tough. The compositions of the instant invention are readily fabricated into these articles having superior physical properties as compared to those compositions of the aforementioned patents.

GENERAL DESCRIPTION

This present invention relates to unique and novel plasticized elastomeric metal neutralized sulfonated EPDM terpolymers having at least 65 wt. % and no more than 80 wt. % ethylene in the backbone of the EPDM terpolymer and blend compositions of these metal neutralized sulfonated EPDM terpolymers, an inorganic filler, a non-polar process oil, and a preferential plasticizer wherein the resultant composition or sulfonated EPDM terpolymer has an improved balance of physical and rheological properties. The resultant compositions are readily processable in a conventional injection molding or extrusion process into a high performance elastomeric article such as ski boots, automotive parts, medical tubing or wire insulation. The resultant elastomeric article has excellent low and elevated temperature flexibility, excellent tensile properties at 25° C. and 70° C., and a rubber-like feel.

Various critically selected additives can be incorporated into the blend compositions such as a polyolefin thermoplastic for further modification of hardness as well as rheological properties, a whitening pigment, a lubricant for improvement of the physical appearance such as shine as well as the ability to easily eject the formed article from the mold during the injection molding process and a reinforcing filler such as silica or carbon black, wherein the reinforcing filler constitutes a minor portion of the composition.

The neutralized sulfonated elastomeric polymer of this present instant invention are derived from unsaturated EPDM terpolymers.

The EPDM terpolymers of the instant invention are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600 which are incorporated herein by reference. The preferred polymers contain about 65 to about 80 wt. % ethylene, more preferably about 68 to about 78, and most preferably about 70 to about 75 wt. %, and about 1 to about 10 wt. % of a diene monomer, the balance of the polymer being propylene.

In order to possess desirable rubbery characteristics it is important that the crystallinity of the EPDM's not be too high. The crystallinity, which is essentially polyethylenic in nature, is varied primarily through the control of the ethylene content. For the purposes of this invention the crystallinity level need not be high to obtain the beneficial effects of the crystallinity because at high ethylene levels the products became too thermoplastic in nature. The upper limit of ethylene content for the polymers of this invention is about 80 wt. %. Above this level the elastomeric characteristics became less desirable, for example the materials become harder and stiffer, exhibit high modulus, and undergo plastic deformation. It is possible to increase crystallinity in EPDM's through the proper choice of the catalysts used in the manufacture of the EPDM. The monomer reactivity ratios can be such that less random, more block-type copolymers are obtained which can manifest polyethylene crystallinity. In some catalyst systems polyethylene crystallinity can be observed at ethylene levels of about 65 wt. %.

A preferred EPDM is one containing about 70 wt. % ethylene and about 5 wt. % of a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

The EPDM terpolymers of this invention have a number average molecular weight ($\overline{M}n$) of about 10,000 to about 200,000, more preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

In carrying out the invention, the EPDM terpolymer is dissolved in a non-reactive solvent such as an aromatic hydrocarbon or an aliphatic hydrocarbon such as chlorobenzene, benzene, toluene, xylene, cyclohexane, pentane, isopentane, hexane, isohexane or heptane. The most preferred EPDM's are those which, while they possess sufficient crystallinity to enhance physical properties, are fully soluble in the sulfonation solvent at room temperature. The preferred solvents are the lower boiling aliphatic hydrocarbons. A sulfonating agent is added to the solution of the elastomeric polymer and non-reactive solvent at a temperature of about $-10°$ C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, and U.S. Ser. No. 855,701 (filed the same day as this application) which are incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, etc. Typical Lewis bases are: dioxane, tetrahydrofuran, tetrahydrothiophene and triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the EPDM terpolymer backbone. The reaction is quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated elastomeric polymer has about 10 to about 60 meq. $SO_3H$ groups per 100 grams of sulfonated polymer, more preferably about 15 to about 50, and most preferably about 20 to about 40. The $SO_3H$ content of the polymer can be determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated EPDM terpolymer is gel free and hydrolytically stable. Gel is measured by stirring a given weight of polymer in a solvent comprised of 95 toluene/5 methanol at a concentration of 5 wt. % for 24 hours, allowing the mixture to settle, withdrawing a weighed sample of the supernatant solution and evaporating to dry-ness. By gel free is meant that at least 95% of the polymer is soluble under the above conditions.

In both the titration and the determination of gel it is sometimes necessary to effect these determinations at somewhat elevated temperatures due to the presence of polyethylenic crystallinity rendering the sulfonated polymers partly insoluble due to these crystalline effects. The temperatures chosen for these determinations are slightly above those at which the base, unsulfonated EPDM is soluble in toluene at a concentration of 50 g./liter toluene.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated EPDM terpolymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups IA, IIA, IB or IIB of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Useful examples of metal hydroxides are NaOH, KOH, LiOH, $Mg(OH)_2$ and $Ba(OH)_2$.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosities of the systems investigated were determined by the use of an Instron Capillary Rheometer. Generally, the melt viscosity measurements were made at a temperature of 200° C. and at various shear rates corresponding to crosshead speeds from about 0.005 in/min to about 20 in/min. The apparent viscosity at 200° C. and at a low shear rate, for example 0.73 $sec^{-1}$, is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for extrusion of a given material. This is used as a characterization parameter for compounds employed in extrusion processing.

In addition to capillary rheometer determinations melt viscosities of many systems were obtained by determining the melt index at 190° C., generally 250 psi. Materials possessing a melt index under these conditions of about 0.2 g./10 minutes or greater can be considered easily mixable with plasticizers, fillers, extender oils, and other additives in high intensity, high shear rate mixers. Materials can be considered to be extrudable or injection moldable when they possess a melt index under these conditions of about 5 g./10 minutes and greater.

When essentially amorphous ethylene-propylene terpolymers are sulfonated and neutralized improvements in tensile properties occur with increasing sulfonate content. However, tensile properties in these systems are generally modest and yet these improvements are accompanied by substantial increases in melt viscosity which thereby adversely affects melt processability. These increases in melt viscosity can be countered through the use of ionic domain plasticizers. Most ionic plasticizers exert a deleterious effect upon the physical properties of metal sulfonated containing EPDM, especially the zinc sulfonate at higher temperature, for example 70° C. Some plasticizers, such as the amides and especially the zinc salts of carboxylic acids, not only improve melt flow but also improve tensile properties at both room temperature and elevated temperatures. The most useful and most outstanding of these plasticizers is zinc stearate. Outstanding physical properties can be obtained at higher sulfonate levels and high levels of zinc stearate; however, the amount of zinc stearate required to keep melt viscosity low enough for ready processability becomes impractically high as the sulfonate content becomes large, for example 40 meq. sulfonate/100 parts polymer. Zinc stearate is relatively expensive and also increases hardness. Thus high levels should not be used where softer gums and compounds are required.

On the other hand for many thermoplastic elastomer applications it is desirable to increase hardness. Metal sulfonate containing EPDM's are quite soft when the EPDM's are fully amorphous, about 50–60 Shore A hardness depending upon sulfonate content. One method of increasing the hardness is to add zinc stearate which also serves to improve melt flow. The use of zinc stearate represents an expensive way to increase the hardness of gums and formulations. Alternatively, the hardness of the gums can be increased by about 5 to about 15 Shore A hardness points simply by increasing the ethylene content of the EPDM. Therefore, this latter approach offers a less expensive control of hardness.

The use of higher ethylene, partly crystalline EPDM's results in tensile properties far better than those obtained with fully amorphous EPDM's at any given sulfonate level. One practical effect of these improvements in physical properties is that significantly lower sulfonate contents can be used with the partly crystalline EPDM's to achieve the same level of strength as that obtained with the amorphous EPDM systems. This reduction in sulfonate content further means a significant reduction in melt viscosity. The use of only modest levels of zinc stearate with the high ethylene EPDM's then permits the preparation of processable gums and formulations which have superior physical properties but are about as readily melt processable as fully amorphous plasticized metal sulfonate containing EPDM's.

In U.S. Pat. No. 3,887,530 improvements in physical properties of neutralized sulfonated EPDM's through the use of partly crystalline EPDM's was demonstrated. This patent did not demonstrate or teach that the neutralized sulfonate containing EPDM's are difficult, if not impossible, to process in commercial injection molding equipment under practical conditions. It also failed to recognize that melt viscosity is dependent upon the type of metal cation contained in the metal sulfonate EPDM's. Cations derived from metals such as lithium, sodium, potassium, magnesium, mercury, cobalt, calcium and barium impart very high melt viscosities. The zinc cation, on the other hand, provides for significantly reduced melt viscosities. Even the zinc cation is not sufficient of itself in producing unplasticized gums and formulations with good processability. A plasticizer is required for this purpose. U.S. Pat. No. 3,887,530 not only failed to recognize or teach the preferred use of the zinc cation but also the use of plasticizers to obtain gums and formulations which possessed not only outstanding physical properties but also excellent melt flow. Finally, the cited patent did not recognize or teach the criticality of EPDM molecular weight in its relation to melt flow of the sulfonated systems.

Since the partly crystalline EPDM's allow for a reduction in sulfonate content and since zinc stearate is such a powerful and beneficial plasticizer it is possible to use a metal sulfonate containing EPDM's wherein the metal counterion is derived from aluminum, antimony, and iron and Groups IA, IB, IIA and IIB of the Periodic Table of Elements. Of all these metals, zinc is the most preferred.

The preferential plasticizers are the amides or the zinc salts of carboxylic acids having about 10 to about 30 carbon atoms, more preferably about 12 to about 22 carbon atoms, for example, lauric, myristic, palmitic, or stearic acids. Another particularly effective preferential plasticizer is a zinc salt of a rosin acid. The preferential plasticizer is incorporated into the neutralized sulfonated EPDM terpolymer at about less than about 60 parts per hundred by weight based on 100 parts of the sulfonated polynmer, more preferably at about 5 to about 30 and most preferably at about 8 to about 40.

The metal neutralized sulfonated EPDM terpolymers of this invention are especially useful in developing extended systems of exceptional tensile properties as contrasted to the systems in the prior art. Physical properties such as tensile strength are exceptional at room temperature and at elevated temperature.

Typically, the incorporation of fillers in thermoplastic materials results in a marked decrease in physical properties such that only modest levels of such fillers can be tolerated, and, yet retain the desirable tensile properties of the filled objects. Surprisingly, the polymers of the instant invention possess the capability of being highly extendable with good resultant physical properties in systems described below.

The neutralized sulfonated EPDM terpolymer can be blended with a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from talcs, ground calcium carbonate, water precipitated calcium carbonate, or delaminated, calcined or hydrated clays and mixtures thereof. These fillers are incorporated into the blend composition at less than about 300 parts per hundred, more preferably less than about 250 and most preferably less than about 200. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Talc magnesium silicate | Mistron Vapor | 60–70 | 2.75 | 2 | 9.0–7.5 |

The oils employed in the present invention are non-polar process oils having less than about 2 weight percent polar type compounds as measured by molecular type clay gel analysis. These oils are selected from paraffinics ASTM Type 105B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

It is emphasized that the sulfonated EPDM elastomers of the instant invention possess a different degree of compatibility with typical non-polar process oils than do the non-crystalline systems of the prior or copending art. It is believed that the presence of crystallinity in the base EPDM elastomer can result in oil bleed-out or exudation when the oils are present at high levels and the blends are stored at ambient or low temperature. Therefore, oil levels employed with these systems are typically lower than with noncrystalline sulfonate EPDM compositions. The levels of oil which can be incorporated without the attendant exudation problems are dependent on the level of crystallinity in the EPDM, and consequently upon the ethylene level. At the upper limits of ethylene content, oil levels above 50 parts should normally not be employed, whereas at ethylene levels of 65%, oil levels of 100 parts can usually be employed based on 100 parts of sulfonated EPDM. The amount of oil which is preferred for a particular application will typically depend on the desired hardness, tensile properties, flow behavior, and cost considerations of the final compound. These factors are readily evident to one skilled in the art of elastomer compounding with the teachings of the instant invention.

The oils are incorporated into the blend composition at a concentration level of less than about 100 parts per hundred, more preferably less than about 75, and most preferably less than about 50.

A lubricant can be employed in the blend composition at a concentration level of about 0 to about 20 parts per hundred based on 100 parts of the neutralized sulfonated elastomeric polymers, and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 weight percent polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of silica, carbon black or calcium silicate and mixtures thereof. These reinforcing agents are generally characterized as having particle sizes below 0.1 microns and oil absorption above about 100. These reinforcing fillers are incorporated in the blend composition at about 0 to 50 parts per hundred based on 100 parts of sulfonated polymer, more preferably 0 to 25. The ratio of filler to reinforcing agent is at least about 1, more preferably about 2, and most preferably about 3.

The ingredients incorporated into the blend compositions of the present invention, in conjunction with the EPDM terpolymer having at least 65 weight percent ethylene in the backbone of the EPDM terpolymer, the degree of sulfonation, and the metal counterion of the neutralized sulfonated elastomeric polymer, and the plasticizer give materials processable by extrusion or injection molding processes into elastomeric articles having the desirable physical and rheological properties. The improved balance of physical properties and rheological processability characteristics has not been previously obtainable in the aforementioned U.S. patents previously incorporated herein by reference.

A crystalline polyolefinic thermoplastic can be incorporated into the blend composition in minor proportions as a means of further modification of the rheological properties of the blend composition as well as the physical properties of the elastomeric article. Typically, the crystalline polyolefinic thermoplastic is added to the blend composition at a concentration of about 0 to about 100 parts by weight per hundred of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an alpha-olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

A series of metal sulfonate containing EPDM's was prepared from a 20 Mooney (ML, 1+8, 212° F.) EPDM containing about 50 weight % ethylene and about 5 weight % 5-ethylidene-2-norbornene. The base polymer was derived from the hot extruder breakdown of commercial Vistalon 2504 (Exxon Chemical Co.). To a cement of 800 g. of the EPDM in 8000 ml. hexane was added with agitation 45.9 ml. of acetic anhydride followed by 16.8 ml. of concentrated sulfuric acid. After 30 minutes the sulfonation was terminated through the addition of 1200 ml. isopropanol. Antioxidant 2246 (4.0 g.) was added, and the cement was steam stripped. The polymeric sulfonic acid was washed with water in a Waring blender, and the wet crumb was dewatered and dried on a warm (100°–120° F.) rubber mill. Titration of the product in toluene-methanol solution with ethanolic sodium hydroxide showed it to contain about 30.7 meq. of acid/100 polymer. Sulfur content was 0.945 weight % by Dietert analysis which corresponds to 29.5 meq. sulfonic acid/100 polymer.

A series of metal sulfonate salts was prepared from the free polymeric acid as follows: 100 g. of the dewatered polymer was dissolved in 1000 ml. hexane and 150 ml. isopropanol. Each of the following metal acetates was dissolved in water at a level of 90 meq./25 ml. water: $Hg(OOCCH_3)_2$, $Ca(OOCCH_3)_2.2H_2O$, $NaOOCCH_3.3H_2O$, $LiOOCCH_3.2H_2O$, $Mg(OOCCH_3)_2.4H_2O$, $Zn(OOCCH_3)_2.2H_2O$, $Co(OOCCH_3)_2.4H_2O$, and $Ba(OOCCH_3)_2$. The mercuric acetate-water mixture was warmed to aid solution. The aqueous solution of 90 meq. metal acetate was added to the solution of the free polymeric sulfonic acid and, after sufficient agitation, the neutralized products were isolated by steam stripping, washing with water in a Waring blender, and drying on a rubber mill at greater than 210° F.

Tensile strengths on microdumbbells were determined at both room temperature and at 70° C. with an Instron TM table model instrument at the rate of 2 inches/minute. Attempts were made to determine melt index (ASTM 1238-70) at 190° C. and 476 psi. The melt viscosities of the samples were determined with an Instron table model capillary rheometer at 200° C. and at various shear rates. The apparent viscosity at 200° C.

and at a shear rate of 0.88 sec$^{-1}$ is useful as a characterization parameter. A measure of the melt elasticity of a given system can also be obtained from rheological measurements. A type of flow instability known as melt fracture can occur. This instability is shear rate dependent. The shear rate for the onset of melt fracture indicates the upper shear rate for processing a given material and is useful as a characterization parameter for materials employed in extrusion processing. The flow and tensile properties of these various metal sulfonate EPDM's are given in Table III.

The mercuric sulfonate did not form a coherent strand during testing in the capillary rheometer. The viscosities of all other metal sulfonates were uniformly high with the exception of the zinc salt. None of the metal sulfonates flowed during melt index measurement except for the zinc salt. These results demonstrate the effect that cation type has on the rheological properties of metal sulfonate EPDM's. They also show that the zinc salt stands out above all the others listed in providing for a low melt viscosity.

The physicsal properties in all cases were not very good although zinc gave the best tensile properties at room temperature and among the best at 70° C.

effects that zinc stearate exerts upon all metal sulfonate containing EPDM's, regardless of cation type.

TABLE IV

| | EFFECT OF ZINC STEARATE AND CATION ON TENSILE AND RHEOLOGICAL PROPERTIES | | | | | | |
|---|---|---|---|---|---|---|---|
| | Apparent | | | Room Temperature | | 70° C. | |
| Metal | Viscosity Poise × 10$^{-5}$ (0.88 sec$^{-1}$) | Melt Fracture at Shear Rate, sec$^{-1}$ | Melt Index (190° C. 476 psi) g/10 minutes | Tensile Strength, psi | Elongation, % | Tensile Strength, psi | Elongation, % |
| Hg | 12.7 | 29 | 2.2 | 400 | 160 | 170 | 90 |
| Mg | 5.7 | 1469 | 2.1 | 2130 | 510 | 610 | 390 |
| Ca | 6.0 | 294 | 2.4 | 1900 | 470 | 590 | 360 |
| Co | 6.1 | 1469 | 2.2 | 2020 | 490 | 670 | 400 |
| Li | 3.4 | 1469 | 7.4 | 1970 | 490 | 460 | 440 |
| Ba | 10.7 | 88 | 1.0 | 1710 | 480 | 540 | 340 |
| Na | 5.0 | 294 | 4.5 | 1690 | 500 | 430 | 420 |
| Zn | 1.5 | >1469 | 16.8 | 2470 | 480 | 770 | 580 |

EXAMPLE 3

A series of zinc sulfonate containing EPDM's varying in sulfonate content were prepared from the 20 Mooney EPDM described in Example 1. To a solution of 800 g. of EPDM in 8000 ml. of hexane at room temperature was added acetic anhydride followed by concentrated sulfuric acid (acetic anhydride/H$_2$SO$_4$=1.62). After 30 minutes the sulfonation was terminated and the polymeric sulfonic acid simultaneously neutralized through the addition of a solution of zinc acetate (2.4 moles/mole H$_2$SO$_4$) in 640 ml. methanol and 24 ml. water. Irganox 1010 (0.8 g.) was added, and after 30 minutes the cement was steam stripped to isolate the product. The product was washed with water and pulverized in a Waring blender, and the wet crumb was dried on a rubber mill at about 210° F.

Tensile strengths on microdumbbells were determined at both room temperature and at 70° C. Melt index was determined at 190° C. and 250 psi. (ASTM 1238-70, Condition J). The melt viscosities of the samples were determined with an Instron capillary rheometer at 200° C. and at various shear rates corresponding to crosshead speeds of from 0.005 to 20 inches/minute.

Table V details the compositions of the zinc sulfonate EPDM's, their tensile properties at room temperature and 70° C., and their melt indexes. Rheological data are given in Table VI.

These data show that zinc sulfonate EPDM's improve in tensile properties with increasing sulfonate content; however, this improvement occurs at the expense of higher melt viscosity and poorer processability. Even when modest physical properties are obtained most of these materials do not have sufficiently low melt viscosities to be considered suitably processing materials.

TABLE III

| | EFFECT OF CATION ON TENSILE AND RHEOLOGICAL PROPERTIES | | | | | | | | |
|---|---|---|---|---|---|---|---|---|---|
| | Apparent | | | Room Temperature | | | 70° C. | | |
| Metal | Viscosity, Poise × 10$^{-5}$ (0.88 sec$^{-1}$) | Melt Fracture at Shear Rate, sec$^{-1}$ | Melt Index (190° C. 476 psi) 8/10 min. | 300% Modulus, psi | Tensile Strength, psi | Elongation, % | 300% Modulus, psi | Tensile Strength, psi | Elongation, % |
| Hg | — | Disintegrated | 0 | — | — | — | — | — | — |
| Mg | 55.0 | ≦0.88 | 0 | — | 320 | 70 | — | 150 | 40 |
| Ca | 53.2 | ≦0.88 | 0 | — | 410 | 90 | — | 170 | 40 |
| Co | 52.3 | ≦0.88 | 0 | — | 1180 | 290 | — | 450 | 160 |
| Li | 51.5 | ≦0.88 | 0 | 710 | 760 | 320 | — | 250 | 130 |
| Ba | 50.8 | ≦0.88 | 0 | — | 340 | 70 | — | 150 | 30 |
| Na | 50.6 | ≦0.88 | 0 | 870 | 960 | 350 | — | 270 | 110 |
| Zn | 12.0 | 147 | 0.75 | 1010 | 1480 | 400 | 210 | 270 | 450 |

EXAMPLE 2

The unplasticized metal sulfonate EPDM's described in Example 1 were dissolved in 95 volume % toluene/5 volume % methanol at a concentration of about 100 g./liter. To each solution was added zinc stearate (Mallinckrodt Chemical Co.) at a level of 90 milliequivalents/100 grams polymer. The plasticized polymers were isolated and tested as described in Example 1. Tensile, melt index, and rheological data are given in Table IV.

These data clearly show the marked decrease in apparent viscosity simultaneous with an improvement in tensile properties over the unplasticized gums of Example 1 (Table III). This example illustrates the beneficial

TABLE V

UNPLASTICIZED ZINC SULFONATE EPDM (50 WEIGHT % ETHYLENE) PROPERTIES AS A FUNCTION OF SULFONATE CONTENT

| | Sulfonate Content | Melt Index | Room Temperature | | | 70° C. | | |
|---|---|---|---|---|---|---|---|---|
| Ex. | meq/100 Polymer | (190° C., 250 psi) g/10 minutes | 300% Modulus, psi | Tensile Strength psi | Elongation % | 300% Modulus, psi | Tensile Strength, psi | Elongation % |
| 3A | 19.2 | 0.41 | 320 | 790 | 520 | 140 | 140 | 300 |
| 3B | 22.9 | 0.28 | 370 | 140 | 560 | 170 | 170 | 320 |
| 3C | 25.6 | 0.14 | 480 | 1240 | 510 | — | 220 | 290 |
| 3D | 30.4 | 0.10 | 645 | 1520 | 500 | — | 290 | 290 |
| 3E | 36.3 | 0.06 | 720 | 1960 | 400 | — | 392 | 310 |
| 3F | 42.2 | 0.03 | 890 | 2300 | 480 | — | 440 | 310 |

TABLE VI

RHEOLOGICAL PROPERTIES OF UNPLASTICIZED ZINC SULFONATE EPDM's AS A FUNCTION OF SULFONATE CONTENT

| Example | 3A | 3B | 3C | 3D | 3E | 3F | 5A | 5B | 5C | 5D |
|---|---|---|---|---|---|---|---|---|---|---|
| Ethylene content of EPDM, Wt. % | 50 | 50 | 50 | 50 | 50 | 50 | 70 | 70 | 70 | 70 |
| Sulfonate Conent, meq/100 Polymer | 19.2 | 22.9 | 25.6 | 30.4 | 36.3 | 42.2 | 13.8 | 25.0 | 33.4 | 40.9 |
| Rheology at 200° C. Viscosity $\times 10^{-5}$, poise | | | | | | | | | | |
| At 0.73 sec$^{-1}$ | 7.85 | 10.22 | 15.17 | 22.60 | 25.18 | 33.46 | 5.92 | 27.43 | 52.50 | 74.03 |
| 7.3 sec$^{-1}$ | 2.20 | 2.74 | 3.74 | 5.21 | 5.70 | 7.20 | 1.98 | 6.35 | MF | MF |
| 14.5 sec$^{-1}$ | 1.45 | 1.79 | 2.37 | 3.32 | 3.66 | MF | 1.34 | 4.05 | — | — |
| 29.1 sec$^{-1}$ | 0.95 | 1.14 | 1.47 | MF | MF | — | 0.89 | MF | — | — |
| 73 sec$^{-1}$ | 0.52 | 0.61 | 0.79 | — | — | — | 0.50 | — | — | — |
| 146 sec$^{-1}$ | 0.32 | 0.37 | MF | — | — | — | 0.31 | — | — | — |
| 291 sec$^{-1}$ | 0.19 | MF | — | — | — | — | 0.19 | — | — | — |
| 728 sec$^{-1}$ | MF | — | — | — | — | — | 0.094 | — | — | — |

MF denotes melt fracture.

EXAMPLE 4

The zinc sulfonate EPDM's of Example 3 were dissolved in 95 toluene/5 methanol at a concentration of about 50 g./liter. To the cements were added various amounts of commercial (Mallinckrodt Chemical Co.) zinc stearate. After the zinc stearate had been dissolved or well dispersed the resultant cements were steam stripped, washed and dried on a rubber mill at about 220° F.

Table VII lists the compositions, tensile properties, and melt indexes of the plasticized compositions.

Marked improvements in melt flow were obtained on the plasticized samples. These improvements in melt flow were not obtained at any sacrifice in tensile properties. In fact a substantial improvement in tensile properties was obtained at both room temperature and at 70° C. The maximum improvements in tensile properties were obtained at levels of zinc stearate in excess of about 10 parts/100 polymer. Improvements were obtained at every level of sulfonation.

This example illustrates the effect of zinc stearate in simultaneously improving the flow properties and the tensile properties of zinc sulfonate EPDM's.

TABLE VII

EFFECT OF SULFONATE CONTENT AND ZINC STEARATE ON THE FLOW AND TENSILE PROPERTIES OF ZINC SULFONATE EPDM (50 WEIGHT % ETHYLENE)

| Base Polymer, Example | Sulfonate Content, meq/ 100 Polymer | Zinc Stearate, g/ 100 g Polymer | Melt Index (190° C. 250 psi) g/10 min. | Room Temperature | | | 70° C. | | |
|---|---|---|---|---|---|---|---|---|---|
| | | | | 300% Modulus, psi | Tensile Strength, psi | Elongation, % | 300% Modulus, psi | Tensile Strength, psi | Elongation, % |
| 3A | 19.2 | 0 | 0.41 | 320 | 790 | 520 | 140 | 140 | 300 |
| | | 3.1 | 0.55 | 420 | 1350 | 560 | 205 | 220 | 350 |
| | | 6.1 | 1.4 | 450 | 1550 | 580 | 210 | 290 | 450 |
| | | 12.3 | 3.4 | 505 | 2190 | 610 | 275 | 360 | 450 |
| | | 18.4 | 5.6 | 560 | 2640 | 640 | 310 | 450 | 450 |
| | | 24.6 | 11.0 | 505 | 2120 | 610 | 270 | 430 | 530 |
| | | 38.9 | 24.9 | 560 | 2450 | 660 | 270 | 460 | 620 |
| 3B | 22.9 | 0 | 0.28 | 370 | 1140 | 560 | 170 | 170 | 320 |
| | | 3.7 | 0.40 | 460 | 1740 | 590 | 260 | 310 | 360 |
| | | 7.4 | 1.1 | 510 | 1935 | 580 | 350 | 480 | 440 |
| | | 14.9 | 3.0 | 570 | 2490 | 590 | 310 | 520 | 510 |
| | | 22.3 | 5.5 | 625 | 2670 | 605 | 370 | 580 | 510 |
| | | 29.8 | 9.7 | 640 | 3350 | 650 | 290 | 560 | 590 |
| | | 38.6 | 17.3 | 665 | 3260 | 660 | 280 | 460 | 530 |
| 3C | 25.6 | 0 | 0.14 | 480 | 1240 | 510 | — | 220 | 290 |
| | | 4.4 | 0.23 | 640 | 2300 | 550 | 340 | 390 | 360 |
| | | 8.7 | 0.68 | 800 | 2700 | 520 | 360 | 560 | 450 |
| | | 17.5 | 2.2 | 930 | 3510 | 560 | 460 | 770 | 490 |
| | | 26.6 | 4.8 | 970 | 3760 | 580 | 420 | 830 | 560 |
| | | 34.9 | 9.2 | 900 | 3920 | 610 | 405 | 770 | 560 |
| | | 38.3 | 10.9 | 930 | 3670 | 590 | 450 | 1040 | 630 |
| 3D | 30.4 | 0 | 0.10 | 645 | 1520 | 500 | — | 290 | 290 |

TABLE VII-continued
EFFECT OF SULFONATE CONTENT AND ZINC STEARATE ON THE FLOW AND TENSILE PROPERTIES OF ZINC SULFONATE EPDM (50 WEIGHT % ETHYLENE)

| Base Polymer, Example | Sulfonate Content, meq/ 100 Polymer | Zinc Stearate, g/ 100 g Polymer | Melt Index (190° C. 250 psi) g/10 min. | Room Temperature 300% Modulus, psi | Tensile Strength, psi | Elongation, % | 70° C. 300% Modulus, psi | Tensile Strength, psi | Elongation, % |
|---|---|---|---|---|---|---|---|---|---|
| | | 5.0 | 0.13 | 1040 | 2170 | 440 | 410 | 420 | 300 |
| | | 10.0 | 0.46 | 1220 | 3480 | 500 | 450 | 610 | 400 |
| | | 20.0 | 1.7 | 1545 | 4580 | 510 | 490 | 670 | 400 |
| | | 29.9 | 4.0 | 1530 | 4360 | 510 | 550 | 930 | 480 |
| | | 39.9 | 9.7 | 1430 | 4400 | 540 | 460 | 1210 | 640 |
| 3E | 36.3 | 0 | 0.06 | 720 | 1960 | 460 | — | 390 | 310 |
| | | 5.6 | 0.07 | 1140 | 2630 | 450 | 500 | 585 | 350 |
| | | 11.2 | 0.28 | 1305 | 3800 | 490 | 460 | 690 | 420 |
| | | 22.4 | 1.3 | 1585 | 5450 | 510 | 530 | 1060 | 520 |
| | | 33.6 | 3.3 | 1400 | 3660 | 510 | 500 | 1150 | 530 |
| | | 44.9 | 8.2 | 1190 | 3940 | 540 | 445 | 870 | 520 |
| 3F | 42.2 | 0 | 0.03 | 890 | 2300 | 480 | — | 440 | 310 |
| | | 6.2 | 0.05 | 990 | 2950 | 500 | 440 | 480 | 390 |
| | | 12.4 | 0.23 | 1185 | 4125 | 510 | 460 | 850 | 510 |
| | | 24.9 | 1.08 | 1400 | 5110 | 515 | 520 | 910 | 490 |
| | | 37.3 | 3.47 | 1450 | 5330 | 550 | 505 | 1250 | 620 |
| | | 49.7 | 8.68 | 1390 | 5390 | 580 | 520 | 1670 | 700 |

EXAMPLE 5

A series of zinc sulfonate containing EPDM's varying in sulfonate content were prepared from a 20 Mooney (ML, 1+8, 212° F.) EPDM containing about 70 weight % ethylene and about 5 weight % 5-ethylidene-2-norbornene. The general procedure for sulfonation, neutralization, and product isolation described in Example 3 was followed for these preparations.

Table VIII details the compositions of the zinc sulfonate EPDM's, their tensile properties at room temperature and 70° C., and their melt indexes. Rheological data are given in Table VI.

The tensile properties of these high (70 weight %) ethylene content zinc sulfonate EPDM's are significantly better than the corresponding gums of lower (50 weight %) ethylene (cf Example 3). However, the melt viscosities of these ionomers are very high (cf Table IV) and, of course, processing is difficult. Processability can be improved through a reduction in sulfonate content for these high ethylene content copolymers. At equivalent tensile properties the high ethylene content gums possess lower viscosity than the lower ethylene content gums; however, to achieve adequate melt processability it is desirable to have a melt index at 190° C. and 250 psi. of at least about 5 and preferably at least about 10 grams/10 minutes. Even at very low sulfonate contents the unplasticized high ethylene ionomers are not sufficiently low in melt viscosity to meet these limitations.

TABLE VIII
ZINC SULFONATE EPDM (70 WEIGHT % ETHYLENE) PROPERTIES AS A FUNCTION OF SULFONATE CONTENT

| Example | Sulfonate Content meq/100 Polymer | Melt Index (190° C. 250 psi) g/10 minutes | Room Temperature 300% Modulus, psi | Tensile Strength, psi | Elongation % | 70° C. 300% Modulus, psi | Tensile Strength, psi | Elongation, % |
|---|---|---|---|---|---|---|---|---|
| 5A | 13.8 | 0.56 | 650 | 2935 | 620 | 100 | 100 | 450 |
| 5B | 25.0 | 0.04 | 1270 | 6060 | 530 | 450 | 550 | 360 |
| 5C | 33.4 | 0.015 | 1930 | 6250 | 470 | 760 | 880 | 345 |
| 5D | 40.9 | 0.008 | 3220 | 5830 | 370 | 770 | 1000 | 360 |

EXAMPLE 6

The zinc sulfonate EPDM's of 70 weight % ethylene content described in Example 5 were mixed with various levels of zinc stearate and isolated according to the procedures described in Example 4.

Table IX lists the compositions, tensile properties and melt indexes of the plasticized compositions.

Just as with the lower ethylene EPDM's substantial reductions in melt viscosity were obtained through the use of zinc stearate plasticizer. And yet the very high room temperature tensile strengths of the unplasticized gums were not adversely affected and the 70° C. tensile strengths were significantly improved. The tensile properties of the zinc stearate plasticized zinc sulfonate high ethylene EPDM's are substantially better than the corresponding plasticized gums from low ethylene EPDM's (cf Table VII).

TABLE IX
EFFECT OF SULFONATE CONTENT AND ZINC STEARATE ON THE FLOW AND TENSILE PROPERTIES OF ZINC SULFONATE EPDM (70 WEIGHT % ETHYLENE)

| Base Polymer, Example | Sulfonate Content, meq/ 100g Polymer | Zinc Stearate, g/ 100g Polymer | Melt Index (190° C. 250 psi) g/10 min | Room Temperature 300% Modulus psi | Tensile Strength psi | Elong. % | 70° C. 300% Modulus psi | Tensile Strength psi | Elong. % |
|---|---|---|---|---|---|---|---|---|---|
| 5A | 13.8 | 0 | 0.56 | 650 | 2935 | 620 | 100 | 100 | 450 |
| | | 2.1 | 0.91 | 670 | 3570 | 615 | 140 | 155 | 430 |
| | | 4.3 | 2.4 | 700 | 3730 | 620 | 140 | 140 | 410 |
| | | 8.6 | 5.2 | 770 | 3670 | 605 | 140 | 140 | 355 |
| | | 12.9 | 7.3 | 770 | 4000 | 630 | 160 | 170 | 390 |

TABLE IX-continued
EFFECT OF SULFONATE CONTENT AND ZINC STEARATE ON THE FLOW AND TENSILE PROPERTIES OF ZINC SULFONATE EPDM (70 WEIGHT % ETHYLENE)

| Base Polymer, Example | Sulfonate Content, meq/ 100g Polymer | Zinc Stearate, g/ 100g Polymer | Melt Index (190° C. 250 psi) g/10 min | Room Temperature | | | 70° C. | | |
|---|---|---|---|---|---|---|---|---|---|
| | | | | 300% Modulus psi | Tensile Strength psi | Elong. % | 300% Modulus psi | Tensile Strength psi | Elong. % |
| | | 17.2 | 10.3 | 790 | 3730 | 630 | 180 | 190 | 350 |
| | | 21.5 | 13.2 | 760 | 3560 | 630 | 180 | 190 | 360 |
| 5B | 25.0 | 0 | 0.04 | 1270 | 6060 | 530 | 450 | 550 | 360 |
| | | 3.8 | 0.10 | 1320 | 6680 | 520 | 460 | 770 | 470 |
| | | 7.5 | 0.29 | 1500 | 7030 | 520 | 450 | 800 | 500 |
| | | 15.0 | 1.3 | 1520 | 6350 | 510 | 410 | 860 | 580 |
| | | 22.6 | 2.8 | 1580 | 6340 | 530 | 430 | 1030 | 630 |
| | | 30.0 | 5.9 | 1500 | 6310 | 550 | 420 | 1070 | 660 |
| | | 37.6 | 9.1 | 1430 | 6090 | 560 | 440 | 1150 | 690 |
| 5C | 33.4 | 0 | 0.015 | 1930 | 6250 | 470 | 760 | 880 | 345 |
| | | 4.9 | 0.03 | 1665 | 6370 | 480 | 650 | 1330 | 500 |
| | | 9.9 | 0.10 | 1905 | 6790 | 470 | 615 | 1740 | 620 |
| | | 19.8 | 0.47 | 2000 | 6480 | 475 | 620 | 2160 | 650 |
| | | 29.7 | 1.7 | 1730 | 6050 | 530 | 550 | 2665 | 780 |
| | | 39.5 | 3.7 | 1910 | 6500 | 510 | 590 | 2780 | 760 |
| | | 49.4 | 8.1 | 1770 | 5730 | 530 | 550 | 2460 | 780 |
| 5D | 40.9 | 0 | 0.008 | 3220 | 5830 | 370 | 770 | 1000 | 360 |
| | | 6.0 | 0.009 | 2460 | 6070 | 420 | 740 | 1130 | 410 |
| | | 11.9 | 0.04 | 2550 | 5190 | 400 | 780 | 1380 | 460 |
| | | 24.0 | 0.35 | 2830 | 6380 | 440 | 760 | 2700 | 660 |
| | | 35.8 | 1.5 | 2750 | 6380 | 460 | 680 | 2980 | 710 |
| | | 47.7 | 4.6 | 2590 | 5840 | 460 | 715 | 2560 | 645 |
| | | 59.7 | 9.0 | 2370 | 6010 | 490 | 660 | 2620 | 690 |

EXAMPLE 7

Three separate gum compositions were prepared from both the 50 weight % ethylene EPDM described in Example 1 and the 70 weight % ethylene EPDM described in Example 5.

The EPDM was dissolved in hexane at a concentration of 100 g./liter hexane. At room temperature was added acetic anhydride (60.75 mmoles/100 g. EPDM) followed by concentrated sulfuric acid (37.5 mmoles/100 g. EPDM). After 30 minutes a sample was taken for sulfur analysis, and the cement was neutralized in each of the following ways:

Method A

The sulfonation mixture was inactivated and neutralized with a solution of 6.58 g. (60 meq.) of zinc acetate dihydrate in 80 ml. methanol and 3 ml. distilled water per 100 g. EPDM. After 30 minutes 0.5 g. of Antioxidant 2246 was added. This material is designated as NPG (non-plasticized gum).

Method B

Neutralization was effected with 7.67 g. (70 meq.) of zinc acetate dihydrate in 80 ml. methanol and 3 ml. water per 100 g. EPDM. After 30 minutes 12.8 g. (45 mmoles) of stearic acid and 0.5 g. Antioxidant 2246 per 100 g. EPDM were added, and the mixture stirred for 2 hours. This material is designated as 70/45 (70 meq. zinc acetate/45 mmoles stearic acid per 100 g. EPDM).

Method C

Neutralization was effected with 13.1 g. (120 meq.) of zinc acetate dihydrate in 80 ml. methanol and 3 ml. water. After 30 minutes 8.5 g. stearic acid (30 mmoles) and 0.5 g. Antioxidant 2246 per 100 g. EPDM were added, and the mixture stirred for 2 hours.

All of the above gums were worked up by steam stripping and washing the polymers with water in a Waring blender. The resultant wet crumb was dried on a rubber mill at 230° F.

Shore A hardness, melt index at 190° C. and 250 psi., and tensile properties at both room temperature and 70° C. were determined for each of the gums, and the data are tabulated in Table X. In each different composition the 70 weight % ethylene EPDM possessed markedly better tensile properties than the lower ethylene content EPDM. In addition the higher ethylene gums were harder than the low ethylene gums. Plasticizer significantly improves melt flow (decreases melt viscosity). In the 70/45 gums the plasticizer is a mixture of stearic acid and zinc stearate which is formed during the neutralization step. If desired a small amount of zinc oxide can be mixed with the gum for a few minutes at 150° C. to convert all stearic acid to zinc stearate. The 120/30 gum contains only zinc stearate. Where the NPG gums might not have sufficiently low melt viscosity to be easily mixed with fillers and extenders the plasticized gums have lower viscosity and are readily mixed and compounded to a variety of filled and extended formulations.

TABLE X
Effect of Composition and EPDM Ethylene Content on the Properties of Zinc Sulfonate EPDM

| Run | Comp. | EPDM Ethylene Content Wt. % | Sulfonate Content meq/100 EPDM | Melt Index (190° C., 250 psi) g/10 minutes | Shore A Hardness | Room Temperature | | | 70° C. | | |
|---|---|---|---|---|---|---|---|---|---|---|---|
| | | | | | | 300% Mod. psi | Tensile Strength psi | Elong. % | 300% Mod. psi | Tensile Strength psi | Elong. % |
| A-1 | NPG | 50 | 37.0 | — | 64 | 1105 | 2260 | 440 | — | 450 | 240 |
| A-2 | NPG | 70 | 34.0 | — | 75 | 1590 | 6360 | 470 | 700 | 980 | 390 |
| B-1 | 70/45 | 50 | 33.7 | 0.29 | 67 | 570 | 2410 | 610 | 120 | 180 | 610 |
| B-2 | 70/45 | 70 | 36.0 | 0.12 | 75 | 930 | 6110 | 560 | 210 | 410 | 560 |
| C-1 | 120/30 | 50 | 35.7 | 0.36 | 72 | 1270 | 3570 | 485 | 380 | 570 | 460 |

TABLE X-continued

Effect of Composition and EPDM Ethylene Content on the Properties of Zinc Sulfonate EPDM

| Run | Comp. | EPDM Ethylene Content Wt. % | Sulfonate Content meq/100 EPDM | Melt Index (190° C., 250 psi) g/10 minutes | Shore A Hardness | Room Temperature 300% Mod. psi | Tensile Strength psi | Elong. % | 70° C. 300% Mod. psi | Tensile Strength psi | Elong. % |
|---|---|---|---|---|---|---|---|---|---|---|---|
| C-2 | 120/30 | 70 | 31.4 | 0.25 | 80 | 1950 | 7500 | 475 | 330 | 760 | 580 |

EXAMPLE 8

A series of thirteen zinc sulfonate EPDM gums of different composition were prepared from the 70 weight % ethylene EPDM described in Example 5. Each run was made from 200 g. EPDM, 2000 ml. hexane, 56.7 mmoles of acetic anhydride, and 35.0 mmoles of concentrated sulfuric acid as described in Example 7. After 30 minutes of sulfonation samples for sulfur analysis were taken, and neutralization was immediately effected with a solution of zinc acetate (variable) in 160 ml. methanol/6 ml. water. After 30 minutes 1.0 g. Antioxidant 2246 and stearic acid (variable) were added, and the resultant mixture was stirred for 2 additional hours. The gums were isolated by steam stripping, washing the product with water in a Waring blender, and drying the resultant wet crumb on a rubber mill at about 220° F.

The sulfonate contents, the amounts of zinc acetate used for neutralization, and the amounts of stearic acid added are given in Table XI. The relative amounts of zinc acetate and stearic acid are such that all, or almost all, of the stearic acid added is converted to zinc stearate during the process.

Melt index at 190° C. and 250 psi., Shore A hardness, and tensile properties at both room temperature and 70° C. were determined on each gum, and these data are given in Table XI.

Although the gums contain low levels of sulfonate (about 15 meq./100 EPDM) each has excellent tensile strength at room temperature and a melt index of at least 5 g./10 minutes. These gums are sufficiently low in viscosity to be readily extruded and, under appropriately controlled conditions, injected molded to articles with excellent properties. Run M, a 150/90 zinc stearate plasticized gum has excellent properties at both room temperature and 70° C. and a melt index of 13.6 g./10 minutes. A variety of useful gums can be prepared from high ethylene EPDM. It is not possible to prepare such gums with a combination of physical and flow properties from lower ethylene content fully amorphous EPDM's.

TABLE XI

| Run | Sulfonate Content meq/ 100 EPDM | Composition meq. Zinc Acetate-Mmoles Stearic Acid/100 EPDM | Room Temperature 300% Mod. psi | Tensile Strength psi | Elong. % | 70° C. 300% Mod. psi | Tensile Strength psi | Elong. % | Melt Index (190° C., 250 psi) g/10 min. | Shore A Hardness |
|---|---|---|---|---|---|---|---|---|---|---|
| A | 12.0 | 90–30 | 840 | 4340 | 620 | 80 | 70 | 400 | 5.3 | 81 |
| B | 13.7 | 120–30 | 980 | 4280 | 620 | — | 70 | 300 | 6.5 | 84 |
| C | 15.4 | 150–30 | 1030 | 4920 | 600 | 80 | 70 | 440 | 5.4 | 83 |
| D | 15.8 | 90–45 | 940 | 4600 | 610 | 190 | 240 | 530 | 5.7 | 84 |
| E | 15.2 | 120–45 | 960 | 4460 | 610 | 140 | 150 | 510 | 6.0 | 85 |
| F | 13.2 | 150–45 | 990 | 4000 | 600 | 70 | 60 | 390 | 8.2 | 85 |
| G | 15.2 | 90–60 | 575 | 3440 | 730 | — | 90 | 300 | 9.5 | 87 |
| H | 14.3 | 120–60 | 905 | 4050 | 660 | 140 | 150 | 490 | 10.5 | 86 |
| I | 15.2 | 150–60 | 900 | 4580 | 650 | 90 | 110 | 520 | 7.2 | 87 |
| J | 14.0 | 120–75 | 665 | 3330 | 660 | 170 | 160 | 380 | 12.2 | 87 |
| K | 15.5 | 150–75 | 830 | 4280 | 660 | 120 | 140 | 540 | 11.4 | 87 |
| L | 13.2 | 120–90 | 545 | 2910 | 680 | — | 100 | 210 | 12.6 | 89 |
| M | 15.5 | 150–90 | 870 | 5040 | 660 | 180 | 260 | 600 | 13.6 | 88 |

EXAMPLE 9

Another series of 13 zinc sulfonate EPDM's identical in composition to those described in Example 8 was synthesized except that the preparations were effected with 200 g. of 70 weight % EPDM, 2000 ml. hexane, 72.9 mmoles acetic anhydride, and 45.0 mmoles of concentrated sulfuric acid. This series is identical with the series of Example 8 except that sulfonate contents are about 5 meq./100 EPDM higher.

Composition, hardness, melt index, and tensile properties are given in Table XII.

This series shows that outstanding tensile properties at both room temperature and 70° C. are obtained with the 70 weight % EPDM and yet with the use of zinc stearate plasticizer melt viscosities can be sufficiently low so that these gums can be at least extruded and, in some cases, injection molded into articles with outstanding physical properties. Such a combination of properties is not possible with low ethylene content fully amorphous EPDM's and in the absence of zinc stearate plasticizer.

TABLE XII

| Run | Sulfonate Content, meq/100 EPDM | Composition meq. Zinc Acetate mmoles Stearic Acid/100 EPDM | Room Temperature 300% Mod. psi | Tensile Strength, psi | Elong. % | 70° C. 300% Mod. psi | Tensile Strength, psi | Elong. % | Melt Index (190°, 250 psi) g/10 minutes | Shore A Hardness |
|---|---|---|---|---|---|---|---|---|---|---|
| A | 20.3 | 90–30 | 1300 | 6340 | 540 | 270 | 560 | 620 | 1.2 | 82 |
| B | 20.9 | 120–30 | 1310 | 5480 | 540 | 140 | 160 | 810 | 2.1 | 83 |
| C | 20.1 | 150–30 | 1270 | 5750 | 560 | 120 | 160 | 760 | 2.3 | 84 |
| D | 19.1 | 90–45 | 1100 | 5150 | 550 | 320 | 520 | 520 | 2.0 | 87 |
| E | 19.4 | 120–45 | 1180 | 4420 | 570 | 160 | 210 | 630 | 3.3 | 86 |

TABLE XII-continued

| Run | Sulfonate Content, meq/100 EPDM | Composition meq. Zinc Acetate mmoles Stearic Acid/100 EPDM | Room Temperature 300% Mod. psi | Tensile Strength, psi | Elong. % | 70° C. 300% Mod. psi | Tensile Strength, psi | Elong. % | Melt Index (190°, 250 psi) g/10 minutes | Shore A Hardness |
|---|---|---|---|---|---|---|---|---|---|---|
| F | 17.3 | 150–45 | 1290 | 6380 | 570 | 170 | 340 | 770 | 2.7 | 86 |
| G | 19.1 | 90–60 | 710 | 4790 | 640 | 140 | 160 | 350 | 2.3 | 88 |
| H | 20.6 | 120–60 | 310 | 5090 | 600 | 270 | 440 | 540 | 3.7 | 88 |
| I | 20.3 | 150–60 | 1070 | 5150 | 590 | 200 | 400 | 630 | 3.3 | 89 |
| J | 19.7 | 120–75 | 700 | 4000 | 610 | 180 | 250 | 550 | 4.4 | 89 |
| K | 19.7 | 150–75 | 1050 | 5030 | 580 | 250 | 640 | 660 | 4.8 | 89 |
| L | 17.3 | 120–90 | 590 | 3740 | 690 | 110 | 150 | 690 | 5.6 | 89 |
| M | 19.7 | 150–90 | 900 | 5330 | 610 | 260 | 560 | 640 | 6.7 | 90 |

EXAMPLE 10

The plasticized 70 weight % ethylene zinc sulfonate EPDM's Run A and Run D of Example 9 were plasticized with Tufflo 6056 white oil as follows: Fifty grams of plasticized polymer was dissolved in 475 ml. toluene/25 ml. methanol. To the cement was added 2.5 g., 5.0 g., and 10.0 g. (5, 10, and 20 parts/100 plasticized polymer) of Tufflo 6056 white oil. The oil extended gums were isolated and dried as described in earlier examples. Melt index at 190° C. and 250 psi., Shore A hardness, and tensile properties at both room temperature and 70° C. were determined for each oil extended gum. Results are given in Table XIII.

The oil extended gum compositions retain excellent tensile properties both at room temperature and at 70° C. while possessing decreased melt viscosities. These materials can be extruded and injected molded. The oil extended products show a substantial decrease in hardness so that they are readily processable into articles possessing excellent physical properties and excellent flexibility.

TABLE XIII

OIL-EXTENDED COMPOSITIONS

| Base Polymer | Sulfonate Content Meq./100 EPDM | Composition, meq. Zinc Acetate-Mmoles Stearic Acid/100 EPDM | Oil, phr | Melt Index (190° C., 250 psi) g/10 min. | 25° C. Tensile Strength psi | Elong. % | 70° C. Tensile Strength psi | Elong. % | Shore A Hardness |
|---|---|---|---|---|---|---|---|---|---|
| Example 9-A | 20.3 | 90–30 | 0 | 1.2 | 6340 | 540 | 560 | 620 | 82 |
| | | | 5 | 1.6 | 4800 | 550 | 420 | 370 | 80 |
| | | | 10 | 2.2 | 3840 | 530 | 430 | 430 | 78 |
| | | | 20 | 4.2 | 3100 | 590 | 370 | 490 | 74 |
| Example 9-D | 19.1 | 90–45 | 0 | 2.0 | 5750 | 550 | 520 | 520 | 87 |
| | | | 5 | 3.2 | 4830 | 610 | 390 | 490 | 82 |
| | | | 10 | 5.3 | 4290 | 600 | 360 | 510 | 80 |
| | | | 20 | 9.6 | 3300 | 630 | 260 | 530 | 75 |

EXAMPLE 11

Run D of Example 9 was repeated starting with 800 g. of 70 weight % ethylene EPDM. After neutralization, plasticization, and addition of Antioxidant 2246 Tufflo 6056 white oil was added at a level of 24 parts per 100 parts EPDM which corresponds to about 20 parts of oil per 100 of total neutralized and plasticized polymer. The oil extended product was isolated and dried as in earlier examples.

This material contained 20.8 meq. sulfonate/100 g. EPDM. The oil extended product had a melt index at 190° C. and 250 psi of 13.5 g./10 minutes and a Shore A Hardness of 75.

This material was extruded into tubing with a mini-extruder fitted with a small (60 cc.) Brabender mixing head. The temperatures of the heating zones of the extruder were adjusted for the following two conditions:

| | Temperature, °C. | |
|---|---|---|
| | Condition 1 | Condition 2 |
| Zone 1 | 180 | 200 |
| Zone 2 | 190 | 210 |
| Zone 3 | 200 | 220 |
| Die | 200 | 220 |

Extrusions were effected at different rates for each condition: 40, 60, 80, 100, 120, 140, and 160 rpm.

All extrudates under all conditions and at all rpm's were very good in appearance. The outer surfaces were shiny and smooth as well as the inner surface. Increasing rpm did not greatly improve surface characteristics.

Injection molded bars and dumbbells were made with a Boy Injection molder. A variety of conditions were tried but the following conditions were among those giving good looking speciments:

| Temperatures: | Nozzle | 255° C. |
|---|---|---|
| | Middle | 221° C. |
| | Rear | 221° C. |
| | Mold | 110° F. |
| Injection Pressure | 600–700 psi. | |
| Injection Time | 12 seconds | |
| Cooling Time | 20 seconds | |

Tensile properties were determined on 100 mil tensile dubbells and 200 mil tensile bars. At room temperature a tensile strength of 750 psi. and an elongation of 350% elongation was obtained. At 70° C. a tensile strength of 120 psi. and an elongation of 230% were obtained. Specimens were tested at a cross head speed of 20 inches/minute.

Although some specimen shrinkage was observed after injection molding they were excellent in appearance and possessed very good physical properties.

This example demonstrates that oil extended gums can be readily extruded and injection molded to articles with excellent flexibility and excellent physical properties.

EXAMPLE 12

A larger preparation of Run D, Example 8 was made starting with 800 g. 70 weight % ethylene EPDM. Sulfur analysis showed the product to contain 17.5 meq. sulfonate/100 EPDM. The plasticized, neutralized product had a melt index at 190° C. and 250 psi. of 5.0 g./10 minutes and a Shore A hardness of 83.

This plasticized but non-oil-extended material was extruded under essentially the same conditions described in Example 11. Tubing excellent in appearance was obtained with both inner and outer surfaces shiny and smooth. The rpm had no noticeable effect on surface smoothness.

This material was also injection molded under similar conditions to those described in Example 11. Excellent injection molded specimens were obtained. At room temperature and at a jawhead speed of 20 inches/minute the tensile strength was 1130 psi. and the elongation, 440%. At 70° C. tensile strength was 150 psi. and elongation, 230%.

Articles with excellent physical properties can be prepared via extrusion or injection molding from plasticized gums which otherwise contain no fillers or extender oils.

EXAMPLE 13

Gum compositions were prepared from both the 50 weight % ethylene EPDM described in Example 1 and the 70 weight % ethylene EPDM described in Example 5. The gums were prepared according to Method C of Example 7 which produces a zinc sulfonate EPDM plasticized with 30 milliequivalents of zinc stearate/100 g. EPDM. The sulfonate contents calculated from sulfur analyses were about 33 meq. sulfonate/100 EPDM. These samples are designated as A-1 and B-1, and their physical properties are given in Table XIV.

TABLE XIV

| PROPERTIES OF COMPRESSION MOLDED BLENDS | | | | | | |
|---|---|---|---|---|---|---|
| Compound | A-1 | A-2 | A-3 | A-4 | A-5 | A-6 |
| Sample A-1 | | | | 100 | | |
| Sample B-1 | — | — | — | — | — | — |
| Polypropylene | — | 20 | 20 | 20 | 30 | 30 |
| Icekap K, phr | — | — | 50 | 100 | 50 | 100 |
| Room Temperature | | | | | | |
| 100% Modulus, psi | (425) | 550 | 950 | 1400 | 1075 | 1255 |
| 300% Modulus, psi | (1150) | 1150 | 1530 | — | 1355 | — |
| Tensile Strength, psi | (3645) | 3210 | 1710 | 1500 | 1605 | 1275 |
| Elongation, % | (500) | 490 | 380 | 280 | 400 | 195 |
| Permanent Set, % | (31) | 37 | 25 | 19 | 37 | 13 |
| 70° C. | | | | | | |
| 100% Modulus, psi | (265) | 300 | 510 | 810 | 545 | 765 |
| 300% Modulus, psi | (490) | 535 | 885 | — | 875 | — |
| Tensile Strength, psi | (855) | 915 | 1015 | 1015 | 895 | 885 |
| Elongation, % | (475) | 465 | 370 | 210 | 300 | 175 |
| Flex. Mod. R.T., psi | (2140) | 6455 | 6925 | 8905 | 10355 | 14125 |
| Shore A Hardness | (69) | 80 | 85 | 90 | 89 | 93 |
| Flex. Set, 30"/5' | (3/2) | 10.5/8 | 8/5.5 | 10/7 | 12.5/9 | 12.5/9 |
| Compression Set at R.T. | (35) | 33 | 32 | 31 | 35 | 36 |
| at 70° C. | (93) | 90 | 94 | 94 | 94 | 92 |
| Melt Index (190° C.), g/10 Minutes | | | | | | |
| 43 psi | (0.17) | 0.43 | 0.17 | 0.07 | 0.24 | 0.11 |
| 250 psi | (2.51) | 9.01 | 4.62 | 1.91 | 7.18 | 3.36 |
| Compound | B-1 | B-2 | B-3 | B-4 | B-5 | B-6 |
| Sample A-1 | — | — | — | — | | — |
| Sample B-1 | | | | 100 | | |
| Polypropylene | — | 20 | 20 | 20 | 30 | 30 |
| Icekap K, phr | — | — | 50 | 100 | 50 | 100 |
| Room Temperature | | | | | | |
| 100% Modulus, psi | (525) | 810 | 1550 | 1980 | 1680 | 2045 |
| 300% Modulus, psi | (1660) | 1885 | 2640 | 2595 | 2585 | 2610 |
| Tensile Strength, psi | (5530) | 7340 | 5840 | 3510 | 4260 | 3290 |
| Elongation, % | (475) | 490 | 460 | 395 | 410 | 380 |
| Permanent Set, % | (56) | 138 | 138 | 119 | 125 | 113 |
| 70° C. | | | | | | |
| 100% Modulus, psi | (305) | 445 | 785 | 1190 | 925 | 1215 |
| 300% Modulus, psi | (680) | 860 | 1370 | 1680 | 1455 | 1625 |
| Tensile Strength, psi | (900) | 2515 | 2480 | 1925 | 2390 | 1905 |
| Elongation, % | (370) | 605 | 525 | 385 | 510 | 380 |
| Flex. Mod. R.T., psi | (3640) | 7000 | 9685 | 15790 | 13440 | 16360 |
| Shore A Hardness | (78) | 84 | 90 | 93 | 92 | 94 |
| Flex Set, 30"/5' | (4/2.5) | 6/4 | 9.5/6.5 | 10/7 | 10.5/7.5 | 10.5/7.5 |
| Compression Set at R.T. | (53) | 52 | 61 | 53 | 56 | 54 |
| at 70° C. | (81) | 84 | 90 | 90 | 88 | 87 |
| Melt Index (190° C.), g/10 Minutes | | | | | | |
| 43 psi | (0.02) | 0.09 | 0.01 | Nil | 0.07 | Nil |

TABLE XIV-continued
PROPERTIES OF COMPRESSION MOLDED BLENDS

| | | | | | | |
|---|---|---|---|---|---|---|
| 250 psi | (0.41) | 1.37 | 0.37 | 0.27 | 1.38 | 0.72 |

A series of blends was prepared with Samples A-1 and B-1 with varying levels of polypropylene and an inorganic filler known as Icekap K. The blends were prepared by combining the components in a heated high intensity mixer at a temperature of about 180° C. to flux the polypropylene and sulfonated EPDM. After a period of about 10 minutes the various mixtures were dumped from the mixer and sheeted out on a two roll mill at about 180° C.

The various blends were then compression molded at about 400° F. and physical properties obtained on the compression molded pads. The samples A-1 and B-1 were also compression molded and their properties measured for comparison. The physical properties for these systems are indicated in Table XII.

A direct property comparison of the two grams is possible by comparing samples A-1 to B-1, A-2 to B-2, A-3 to B-3, A-4 to B-4, A-5 to B-5, and A-6 to B-6. It is apparent that in all cases the tensile properties of the samples derived from the B samples are markedly superior to those of the A samples. For example, a comparison of sample A-6 and B-6 (which contains 30 parts polypropylene and 100 parts Icecap K filler per 100 parts of gum) shows Sample B-1 to possess a tensile strength of 3290 psi while sample A-1 possesses a tensile strength of only 1275 psi. The differences in tensile properties are even more marked at 70° C.

The surprisingly improved properties obtained from the gums of this invention are not readily explained. It is proposed that the crystalline regions of the high ethylene EPDM interact synergistically with the ionic interactions to provide a very strong system which is not obtained with noncrystalline EPDM's. While these improved properties are readily evident from tensile strength and other physical properties, it is also expected that improvements in properties such as solvent resistance, abrasion resistance and flex fatigue might also be obtained with the preferred compositions of this invention.

What is claimed is:

1. An elastomeric composition which consists essentially of:
   (a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof; and
   (b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms.

2. A polymer according to claim 1, wherein said preferential plasticizer is zinc stearate.

3. A polymer according to claim 1, wherein said preferential plasticizer is stearamide.

4. An elastomeric composition which consists essentially of:
   (a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof;
   (b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms; and
   (c) about 20 to about 100 parts by weight of a crystalline polyolefin per 100 parts of said metal neutralized sulfonated EPDM terpolymer.

5. A polymer according to claim 4, wherein said preferential plasticizer is zinc stearate.

6. An elastomeric composition which consists essentially of:
   (a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof;
   (b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms;
   (c) about 50 to about 300 parts by weight of an inorganic filler per 100 parts of said metal neutralized sulfonated EPDM terpolymer, said inorganic filler being selected from the group consisting of clay, talc and calcium carbonate and mixtures thereof; and
   (d) about 50 to about 100 parts by weight of a nonpolar process oil having less than about 2 wt. % polar type compounds, said non-polar process oil being selected from the group consisting of paraffinics, naphthenics and aromatics and mixtures thereof.

7. A polymer according to claim 6, wherein said preferential plasticizer is zinc stearate.

8. A polymeric formed article formed by a low pressure injection molding process which comprises essentially of an elastomeric composition which consists essentially of:
   (a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof; and (b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms.

9. A polymer formed article according to claim 8, wherein said elastomeric article is a ski boot.

10. A polymeric formed article according to claim 9, wherein said preferential plasticizer is zinc stearate.

11. A polymeric article formed by a low pressure injection molding process which consists essentially of:

(a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof;

(b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms; and (c) about 20 to about 100 parts by weight of a crystalline polyolefin per 100 parts of said metal neutralized sulfonated EPDM terpolymer.

12. A polymer formed article according to claim 11, wherein said elastomeric article is a ski boot.

13. A polymeric formed article according to claim 11, wherein said preferential plasticizer is zinc stearate.

14. A polymeric article formed by a low pressure injection molding process which consists essentially of an elastomeric composition which consists essentially of:

(a) a metal neutralized sulfonated EPDM terpolymer having at least about 65 wt. % ethylene in the backbone of said metal neutralized sulfonated EPDM terpolymer, about 10 to about 60 meq. of metal sulfonate groups per 100 grams of said metal neutralized sulfonated EPDM terpolymer, a metal of said metal sulfonate groups being selected from the group consisting of aluminum, iron, antimony, mercury and Groups IA, IIA and IB of the Periodic Table of Elements and mixtures thereof;

(b) at least 8 parts by weight of a preferential plasticizer per 100 parts of said metal neutralized sulfonated EPDM terpolymer, said preferential plasticizer being selected from the group consisting of stearamides and zinc salts of carboxylic acids having about 12 to about 30 carbon atoms;

(c) about 50 to about 300 parts by weight of an inorganic filler per 100 parts of said metal neutralized sulfonated EPDM terpolymer, said inorganic filler being selected from the group consisting of clay, talc and calcium carbonate and mixtures thereof; and (d) about 50 to about 100 parts by weight of a nonpolar process oil having less than about 2 wt. % polar type compounds, said non-polar process oil being selected from the group consisting of paraffinics, naphthenics and aromatics and mixtures thereof.

15. A polymer formed article according to claim 14, wherein said elastomeric article is a ski boot.

16. A polymeric formed article according to claim 14, wherein said preferential plasticizer is zinc stearate.

* * * * *